US008699403B2

(12) United States Patent
Lynch et al.

(10) Patent No.: US 8,699,403 B2

(45) **Date of Patent: *Apr. 15, 2014**

(54) AIRCRAFT COMMUNICATIONS SYSTEM WITH NETWORK SELECTION CONTROLLER AND ASSOCIATED METHOD

(75) Inventors: Michael J. Lynch, Merritt Island, FL (US); Robert M. Keen, Malabar, FL (US); Jeffrey A. Frisco, Palm Bay, FL (US)

(73) Assignee: LiveTV, LLC, Melbourne, FL (US)

( * ) Notice: Subject to any disclaimer, the term of this patent is extended or adjusted under 35 U.S.C. 154(b) by 50 days.

This patent is subject to a terminal disclaimer.

(21) Appl. No.: 13/435,499

(22) Filed: Mar. 30, 2012

(65) Prior Publication Data

US 2012/0236784 A1 Sep. 20, 2012

Related U.S. Application Data

(63) Continuation of application No. 12/047,367, filed on Mar. 13, 2008, now Pat. No. 8,169,946.

(60) Provisional application No. 60/909,189, filed on Mar. 30, 2007.

(51) Int. Cl.
*H04B 7/185* (2006.01)

(52) U.S. Cl.
USPC ........... 370/316; 370/329; 370/338; 370/401; 455/12.1; 455/431; 455/445

(58) Field of Classification Search
None
See application file for complete search history.

(56) References Cited

U.S. PATENT DOCUMENTS 4,047,175 A 9/1977 Taira et al.
5,055,660 A 10/1991 Bertagna et al.
5,444,762 A 8/1995 Frey et al.
5,530,909 A 6/1996 Simon et al.

(Continued)

FOREIGN PATENT DOCUMENTS

EP 1058409 12/2000
EP 1694090 8/2006

(Continued)

OTHER PUBLICATIONS

A. Sampath et al., Adaptive handoffs Through the Estimation of Fading Parameters, IEEE International Conference on Communications, May 1-5, 1994, vol. 2, pp. 1131-1135.

(Continued)

*Primary Examiner* — Chi Pham
*Assistant Examiner* — Shick Hom
(74) *Attorney, Agent, or Firm* — Allen, Dyer, Doppelt, Milbrath & Gilchrist, P.A.

(57) ABSTRACT

A communications system for an aircraft carrying at least some personnel having personal electronic devices (PEDs) for wireless data communications outside the aircraft includes a ground-based communications network, and a satellite-based communications network. An access point is in the aircraft for providing a WLAN for data communications with the PEDs. An air-to-ground transceiver in the aircraft cooperates with the access point for data communications with the ground-based communications network. A satellite receiver in the aircraft cooperates with the access point for data communications with the satellite-based communications network to the PEDs. At least one network selection controller determines whether to send data communications to the PEDs through the air-to-ground transceiver or the satellite receiver based on a communications link metric.

31 Claims, 9 Drawing Sheets

(56) References Cited

U.S. PATENT DOCUMENTS

| | | | | |
|---|---|---|---|---|
| 5,557,656 | A | 9/1996 | Ray et al. | |
| 5,679,943 | A | 10/1997 | Schultz et al. | |
| 5,907,808 | A | 5/1999 | Vaara et al. | |
| 6,047,165 | A | 4/2000 | Wright et al. | |
| 6,154,637 | A | 11/2000 | Wright et al. | |
| 6,177,887 | B1 | 1/2001 | Jerome | |
| 6,185,430 | B1 | 2/2001 | Yee et al. | |
| 6,253,084 | B1 | 6/2001 | Monot | |
| 6,256,500 | B1 | 7/2001 | Yamashita | |
| 6,259,919 | B1 | 7/2001 | Souonvieri et al. | |
| 6,285,878 | B1 | 9/2001 | Lai | |
| 6,308,045 | B1 | 10/2001 | Wright et al. | |
| 6,327,471 | B1 | 12/2001 | Song | |
| 6,370,357 | B1 | 4/2002 | Xiao et al. | |
| 6,377,802 | B1 | 4/2002 | McKenna et al. | |
| 6,529,706 | B1 | 3/2003 | Mitchell | |
| 6,563,861 | B1 | 5/2003 | Krasny et al. | |
| 6,575,338 | B2 | 6/2003 | Morita et al. | |
| 6,636,574 | B2 | 10/2003 | Mallette et al. | |
| 6,650,898 | B2 | 11/2003 | Jochim et al. | |
| 6,681,326 | B2 | 1/2004 | Son et al. | |
| 6,725,035 | B2 | 4/2004 | Jochim et al. | |
| 6,725,206 | B1 | 4/2004 | Coveley | |
| 6,745,010 | B2 | 6/2004 | Wright et al. | |
| 6,748,597 | B1 | 6/2004 | Frisco et al. | |
| 6,751,801 | B1 | 6/2004 | Frisco et al. | |
| 6,810,527 | B1 | 10/2004 | Conrad et al. | |
| 6,813,493 | B2 | 11/2004 | Criqui et al. | |
| 6,816,728 | B2 | 11/2004 | Igloi et al. | |
| 6,856,803 | B1 | 2/2005 | Gross et al. | |
| 6,889,042 | B2 | 5/2005 | Rousseau et al. | |
| 6,990,319 | B2 | 1/2006 | Wright et al. | |
| 7,016,691 | B2 | 3/2006 | Yaguchi et al. | |
| 7,031,711 | B2 | 4/2006 | Soliman | |
| 7,039,938 | B2 | 5/2006 | Candelore | |
| 7,058,401 | B1 * | 6/2006 | Sinivaara et al. | 455/431 |
| 7,113,780 | B2 | 9/2006 | McKenna et al. | |
| 7,146,147 | B1 | 12/2006 | Sabatino | |
| 7,187,927 | B1 * | 3/2007 | Mitchell | 455/431 |
| 7,640,016 | B2 | 12/2009 | Cruz et al. | |
| 8,094,605 | B2 * | 1/2012 | Lynch et al. | 370/316 |
| 2002/0010633 | A1 | 1/2002 | Brotherston | |
| 2002/0087992 | A1 | 7/2002 | Bengeult et al. | |
| 2003/0028435 | A1 | 2/2003 | Gaillard | |
| 2003/0200547 | A1 | 10/2003 | Frisco et al. | |
| 2004/0024699 | A1 | 2/2004 | Philip | |
| 2004/0139467 | A1 | 7/2004 | Rogerson et al. | |
| 2004/0169587 | A1 | 9/2004 | Washington | |
| 2004/0203779 | A1 | 10/2004 | Gabara | |
| 2005/0026619 | A1 | 2/2005 | Jha | |
| 2005/0044564 | A1 | 2/2005 | Stopniewicz et al. | |
| 2005/0055278 | A1 | 3/2005 | Boyer, Jr. | |
| 2005/0108374 | A1 | 5/2005 | Pierzga et al. | |
| 2005/0138654 | A1 | 6/2005 | Minne | |
| 2005/0198662 | A1 | 9/2005 | Endo et al. | |
| 2006/0085308 | A1 | 4/2006 | Metzger | |
| 2006/0143661 | A1 | 6/2006 | Funderburk et al. | |
| 2006/0234700 | A1 | 10/2006 | Funderburk et al. | |
| 2006/0240833 | A1 | 10/2006 | Kwon et al. | |
| 2006/0253338 | A1 | 11/2006 | Metzger | |
| 2006/0255128 | A1 | 11/2006 | Johnson et al. | |
| 2006/0264242 | A1 | 11/2006 | Dent | |
| 2007/0021117 | A1 | 1/2007 | McKenna et al. | |
| 2007/0042772 | A1 | 2/2007 | Salkini et al. | |
| 2007/0127460 | A1 * | 6/2007 | Wilber et al. | 370/389 |
| 2007/0183435 | A1 * | 8/2007 | Kettering et al. | 370/401 |
| 2008/0102814 | A1 | 5/2008 | Chari et al. | |
| 2012/0236785 | A1 * | 9/2012 | Lynch et al. | 370/316 |
| 2012/0238204 | A1 * | 9/2012 | Lynch et al. | 455/13.1 |

FOREIGN PATENT DOCUMENTS

| | | |
|---|---|---|
| JP | 2000275317 | 10/2000 |
| JP | 2001016155 | 1/2001 |
| WO | 9503595 | 2/1995 |

OTHER PUBLICATIONS

C. Tepedelenlioglu et al., On Velocity Estimation and Correlation Properties of Narrow-Band Mobile Communication Channels, IEEE Transactions on Vehicular Technology, vol. 50, No. 4, Jul. 2001, pp. 1039-1052.

* cited by examiner 100
120
162
PDD/FDD
MEM
HHC
191
155
149
154
ATG ANTENNA
A-G TX/RX
WiFi AP
PASSENGER WiFi PED
CONTROL PANEL
160
130
152
164
200
97
98
99
140
147
HARD HANDOFF CONTROLLER

AIRCRAFT COMMUNICATIONS SYSTEM WITH NETWORK SELECTION CONTROLLER AND ASSOCIATED METHOD

RELATED APPLICATION

This application is a continuation of Ser. No. 12/047,367 filed Mar. 13, 2008, now U.S. Pat. No. 8,169,946 issued May 1, 2012, the entire disclosure of which is hereby incorporated herein by reference.

FIELD OF THE INVENTION

The present invention relates to the field of communications systems, and more particularly, to a communications system for an aircraft having personal electronic devices (PEDs) for communicating outside the aircraft.

BACKGROUND OF THE INVENTION

Existing cellular mobile telecommunication systems serve terrestrial (i.e., ground-based) personal wireless subscriber devices. For discussion purposes, these devices are also referred to as personal electronic devices (PEDs), and include mobile (cellular and PCS) telephones, personal digital assistants, wireless email devices, wireless equipped laptop computers, and personal computers. Since the cellular mobile telecommunication systems are terrestrial-based, they are not readily extendable to non-terrestrial applications due to signal interference problems between ground-based and non-terrestrial personal wireless subscriber devices. Moreover, tower antennas supporting the terrestrial-based system are often pointed down to improve performance.

U.S. Pat. No. 7,113,780 assigned to Aircell, Inc. discloses an aircraft-based network for wireless subscriber devices that provides wireless telecommunication services in the aircraft for both terrestrial and non-terrestrial regions. In particular, an air-to-ground network and a ground-based cellular communications network are spoofed into thinking that the wireless subscriber devices have no special considerations associated with their operation, even though the wireless subscriber devices are located on an aircraft in flight. This requires a non-terrestrial feature transparency system onboard the aircraft to replicate the full functionality of a given wireless subscriber device, which has a certain predetermined feature set from a ground-based wireless service provider, at another wireless subscriber device located within the aircraft. This mirroring of wireless subscriber device attributes enables a localized cell for in-cabin communications yet retains the same wireless subscriber device attributes for the air-to-ground link.

Another aircraft-based network for wireless subscriber devices that provided wireless telecommunication services in an aircraft for both terrestrial and non-terrestrial regions was introduced by Boeing, and was referred to as Connexion by Boeing$^{SM}$. Connexion by Boeing$^{SM}$ is no longer in service due to its failure to attract sufficient customers, but at the time, provided an in-flight online connectivity service. This service allowed travelers to access a satellite-based high-speed Internet connection for an hourly or flat rate fee while in flight through a wired Ethernet or a wireless 802.11 Wi-Fi connection. The infrastructure used a phased array antenna or a mechanically steered Ku-band antenna on the aircraft, a satellite link to and from the aircraft, leased satellite transponders, and ground stations.

Even in view of the advances made to aircraft communications systems allowing passengers to operate wireless portable handheld devices while airborne, there is still a need to improve upon this service.

SUMMARY OF THE INVENTION

In view of the foregoing background, it is therefore an object of the present invention to provide an aircraft communications system in which personal electronic devices (PEDs) can be operated while in flight for communicating outside the aircraft, such as email and text messaging, multimedia messaging, Internet connectivity and credit card transactions.

This and other objects, advantages and features in accordance with the present invention are provided by a communications system for an aircraft carrying at least some personnel having personal electronic devices (PEDs) for wireless data communications outside the aircraft. The communications system may comprise a ground-based communications network, a satellite-based communications network, and an access point in the aircraft for providing a wireless local area network (WLAN) for data communications with the PEDs. An air-to-ground transceiver in the aircraft may cooperate with the access point for data communications with the ground-based communications network. A satellite receiver in the aircraft may cooperate with the access point for data communications with the satellite-based communications network to the PEDs. At least one network selection controller may determine whether to send data communications to the PEDs through the air-to-ground transceiver or the satellite receiver based on a communications link metric.

The communications system further comprising a satellite transmitter in the aircraft for transmitting data communications external the aircraft via the satellite-based communications network. In other words, the communications system comprises a satellite transceiver.

The data communications may comprise email data, text message data, entertainment data and Internet data. Personnel may include passengers as well as other individuals supporting operation of the aircraft. PEDs may include personal mobile telephones (cellular and PCS), personal digital assistants, wireless email devices, and wireless equipped laptop computers having Wi-Fi/WiMax capability or air cards, for example.

The at least one network selection controller may comprise a ground-based network selection controller associated with the ground-based communications network. Alternatively, the at least one network selection controller may comprise an aircraft-based network selection controller associated with the access point and the air-to-ground transceiver.

The communications link metric may be based on a needed channel capacity of the data communications to be sent. The at least one network selection controller may determine whether to send data communications to the PEDs through the air-to-ground transceiver or the satellite receiver based on the needed channel capacity of the data communications to be sent. Data communications with a higher needed channel capacity at a high bandwidth may be sent using the satellite receiver, whereas data communications with a lower needed channel capacity at a low bandwidth may be sent through the air-to-ground transceiver.

High broadband data communications include Internet web pages and television signals, for example, and are transmitted to the satellite receiver in the aircraft via the satellite-based communications network. The at least one network selection controller may thus determine to send web pages through the satellite-based communications network to the PEDs through the access point.

Low broadband data communications include requests for the Internet web pages and television signals, for example, and are transmitted from the air-to-ground transceiver in the aircraft to the ground-based communications network. The at least one network selection controller may thus determine to send requests for web pages from the PEDs through the access point and the air-to-ground transceiver. The ground-based communications network relays the requests to the satellite-based communications network.

Alternatively, the network selection controller may be used to route transmit and or receive traffic over either the satellite or air-to-ground networks. The communications link metric used to make this selection could be made based on the availability or lack of availability of one network, or capacity availability on one or both networks, or positional location of the aircraft.

Another aspect is directed to a method for operating a communications system for an aircraft carrying at least some personnel having personal electronic devices (PEDs) for wireless data communications outside the aircraft. The communications system may comprise a ground-based communications network, and a satellite-based communications network. An access point may be in the aircraft for providing a wireless local area network (WLAN) for data communications with the PEDs, and an air-to-ground transceiver may also be in the aircraft cooperating with the access point for data communications with the ground-based communications network. A satellite receiver in the aircraft may cooperate with the access point for data communications with the satellite-based communications network to the PEDs. The method may comprise determining whether to send data communications to the PEDs through the air-to-ground transceiver or the satellite receiver based on a communications link metric.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
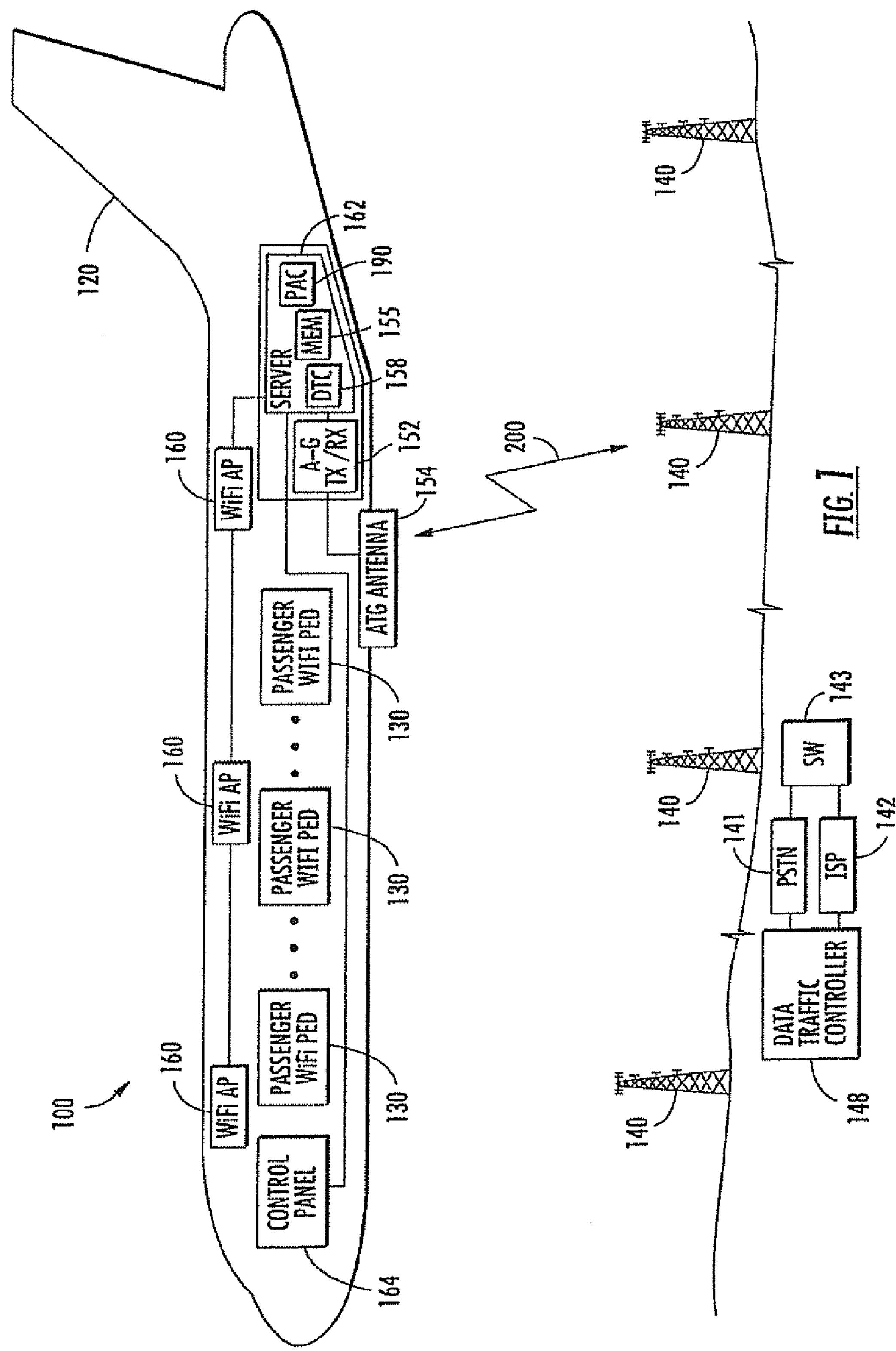
FIG. 1 is a schematic diagram of an air-to-ground communications network in accordance with the present invention.

Referring initially to FIG. 1, an air-to-ground communications network 100 will be discussed in which passengers within an aircraft 120 are able to communicate over an air-to-ground interface 200 using their own personal electronic devices (PEDs) 130. PEDs 130 include personal mobile smart phones or telephones (cellular and PCS), personal digital assistants, wireless email devices, wireless equipped laptop computers having Wi-Fi/WiMax capability, air cards, or WiFi equipped MP3 players, for example.

As will be discussed in greater detail below, the air-to-ground communications network 100 may be considered as a data-based network as compared to a terrestrial voice-based network that also supports data. A data-based network supports emails and text messaging without having to specifically take into account the additional requirements (including latency) associated with traditional two-way, full duplex live conversational voice. However, the air-to-ground communications network 100 supports voice capability, as VoIP, and can send multimedia in the form of streaming video, multimedia web surfing, still pictures, music, etc. As a result, hard handoffs may be used between the ground-based base stations 140 as the aircraft 120 is in flight. Soft handoffs are often used for voice-based networks, which negatively impacts the amount of frequency spectrum needed for a handoff.

The air-to-ground network 100 is not constrained to use air interfaces deployed for terrestrial networks. An air interface that is not used for terrestrial networks may be used.

The air-to-ground interface 200 is used to communicate with the ground-based base stations 140. Each base station 140 illustratively interfaces with the public switched telephone network (PSTN) 141 and an Internet service provider (ISP) 142 through a switch 143 for providing email and text messaging services. The PSTN 141 and the ISP 142 are illustrated for only one of the base stations 40. Alternatively, an Internet connection 42 could only be provided and not a PSTN connection 41.

In the United States, for example, there are approximately 100 base-stations 140 positioned to directly support the air-to-ground communications network 100 disclosed herein. This is particularly advantageous since the frequency band of the air-to-ground interface 200 is different than the frequency bands associated with cellular mobile telecommunication systems. In the illustrated example of the air-to-ground communications network 100, the allocated frequency spectrum of the air-to-ground interface 200 is based on a paired spacing of 851 MHz and 896 MHz, with 0.5 MHz available at each frequency.

In contrast, one portion of the radio spectrum currently used for terrestrial wireless communications companies is in the 824-849 MHz and 869-894 MHz bands. PCS is a wireless communications network that operates at a radio frequency of 1.9 GHz. Internationally, other frequencies and bands have been allocated for licensed wireless communications, but they do not operate using the paired spacing of 851 MHz and 896 MHz.

In the illustrated embodiment, equipment has been installed on the aircraft 120 so that the aircraft appears as a hotspot or intranet to the PEDs 130. Nodes or access points 160 are spaced throughout the cabin area of the aircraft 120 providing 802.11 services (i.e., Wi-Fi) or 802.16 services (i.e., WiMax), for example. In addition, access to the network 100 could be through an on-board picocell in which the PEDs 130 communicate therewith using cellular or PCS functions. A picocell is analogous to a Wi-Fi or WiMax access point 160.

The access points 160 are illustratively connected to an on-board server 162 and an air-to-ground transceiver 152. The server 162 includes a data memory cache 155 and a data traffic controller 158. An air-to-ground antenna 154 is coupled to the air-to-ground transceiver 152. An optional control panel 164 is illustratively coupled to the server 162. The data memory cache 155 is for storing common data accessible by the PEDs 130 during flight of the aircraft 120, as well as caching web pages for web browsing by a PED 130. The data memory cache 155 also stores information during hard handoffs between base stations 140 as part of a store-and-forward capability. In addition to the cache memory 155 scheme, the server 162 includes a memory supporting a pass-through scheme, as readily appreciated by those skilled in the art.

The aircraft-based data traffic controller 158 is for selectively allocating data communications channel capacity between the PEDs 130 and the ground-based base stations 140. Selectively allocating data communications channel capacity may also be alternatively or additionally performed on the ground using a ground-based data traffic controller 148 coupled to the PSTN 141 and the ISP 142. The respective controllers 148, 158 control the IP traffic that will be allowed over the air-to-ground network 200.

The respective controllers 148, 158 thus operate as filters, which may be static or dynamic. Their operation depends on whether the network 100 is lightly loaded or heavily loaded. For example, an email (from the aircraft 120) with a very large attachment would be limited or restricted by the aircraft-based data traffic controller 158, whereas an Internet request resulting in a large number of web pages being sent to a PED 130 (from a ground-based base station 140) would be limited by the ground-based data traffic controller 148.

By selectively allocating the data communications channel capacity, a greater or maximum number of passengers on the aircraft 120 can communicate over the air-to-ground interface 200 using their own PEDs 130. For a given PED 130, the aircraft-based data traffic controller 158 may thus limit data communications from exceeding a predetermined portion of the data communications channel capacity.

Allocation of the data communications channel capacity may be based on a number of different factors or metrics. For example, the respective data traffic controllers 148, 158 may allocate the data communications channel capacity based on a priority of service. For example, credit card information used for on-board purchases/shopping could have a higher priority over email. The data communications may comprise flight operational data and non-flight operational data. Certain types of traffic may have priority over other types of traffic, Personnel having PEDs 130 include passengers, as well as other individuals supporting operation of the aircraft. Personnel with PEDs 130 supporting operation of the aircraft would be associated with flight operational data, and this may be assigned a higher priority.

PEDs 130 that are cellular or PCS devices and are also Wi-Fi compatible are known as dual-mode devices. One of the modes is cellular communications, with the other mode being Wi-Fi communications. Many laptop, personal computers, and PDAs are Wi-Fi/WiMax compatible, which are also classified herein as PEDs. After a connection is made to the on-board server 162 via Wi-Fi or WiMax, each PED 130 can transmit and receive emails and text messages over the air-to-ground interface 200.

The dual-mode PEDs 130 carried by the passengers thus support multiple air interfaces, i.e., a terrestrial network and Wi-Fi or WiMax. Example terrestrial networks include any one of the following: 1) PCS, 2) the GSM family including EDGE, GPRS, HSDPA, HSUPA, and 3) the CDMA family including IS-95, CDMA2000, 1xRTT, EVDO. The terrestrial network may also operate based on other network interfaces standards, as will be readily appreciated by those skilled in the art. To reduce the cost of the dual-mode PEDs 130, a software radio may be used wherein the radio is configured to the air interface standard that is available. If more than one air interface standard is available, different metrics may be evaluated to determine a preferred air interface.

Figure 2:
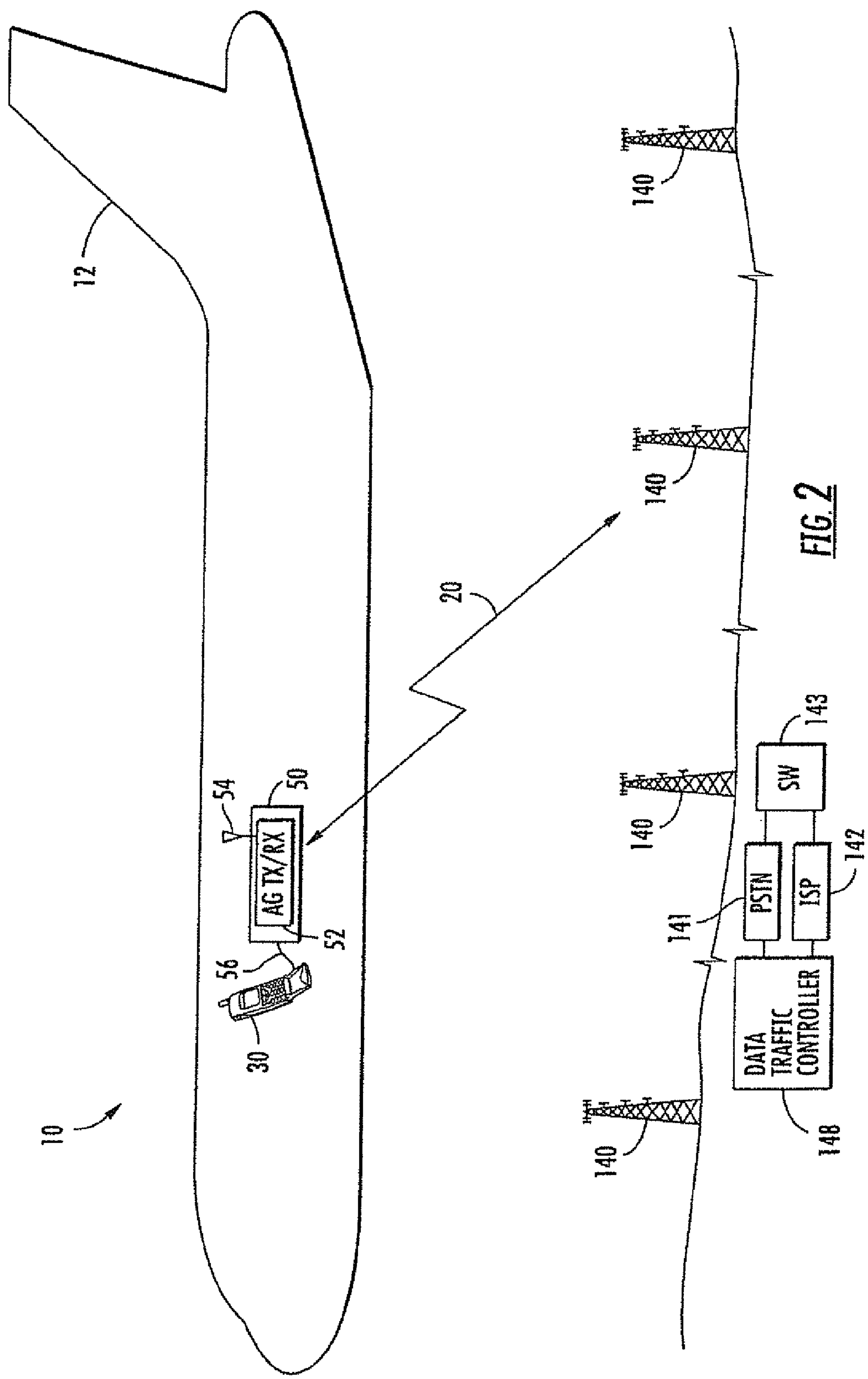
FIG. 2 is a schematic diagram of another embodiment of the air-to-ground communications network with passenger carried equipment on the aircraft in accordance with the present invention.
Figure 3:
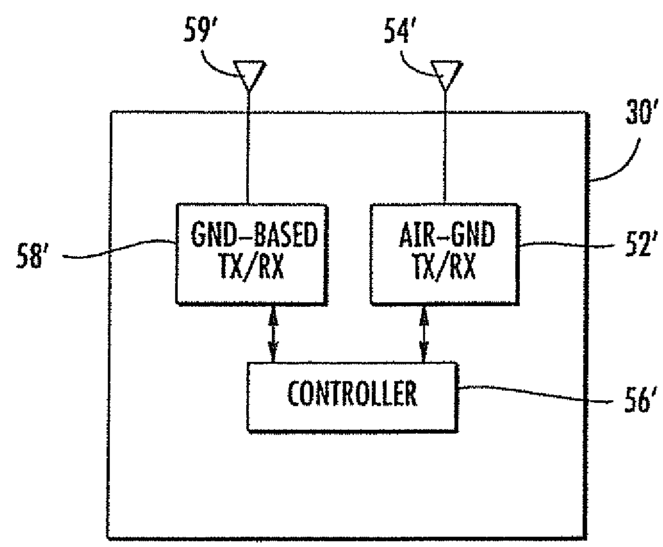
FIG. 3 is a schematic diagram of another embodiment of the PED shown in FIG. 2 with the translator device integrated therein.

Referring now to FIGS. 2 and 3, as an alternative to aircraft installed equipment, a respective translator device 50 may be used to interface between each PED 30 and a ground-based base station 40 over the air-to-ground interface 20. The translator device 50 comprises an air-to-ground transceiver 52 with an air-to-ground antenna 54 coupled thereto.

In the illustrated embodiment, no additional equipment may need to be installed in the aircraft 12 since the translator devices 50 would be brought on-board by the passengers. Each translator device 50 may interface with the PED 30 via a wired or wireless connection. The wireless connection may be a Wi-Fi connection (802.11) or a WiMax connection (802.16), for example. The wired connection may be a USB interface 55.

Alternatively, the translator device may be integrated directly into the PED 30', as illustrated in FIG. 3. The PED 30' would further include a controller 56' for selecting between the ground-based transceiver 58' or the air-to-ground transceiver 52' associated with the translator. A separate antenna 59' is coupled to the ground-based transceiver 58'. Instead of separate antennas 54' and 59', a shared antenna may be used. The controller 56' may perform the selection automatically based on one or more monitored metrics, or the selection may be based on input from the user.

Referring again to FIG. 1, another aspect of the illustrated embodiment is directed to a method for operating a communications system 100 for an aircraft 120 carrying at least some personnel having PEDs 130 for wireless data communications outside the aircraft with a ground-based communications network. The communications system 100 includes an access point 160 in the aircraft 120 for providing a WLAN for data communications with the PEDs 130, and an air-to-ground transceiver 152 in the aircraft 120 cooperating with the access point 160 for data communications with the ground-based communications network. The method may comprise selectively allocating data communications channel capacity between the PEDs 130 and the ground-based communications network using at least one data traffic controller.

The at least one data traffic controller may be an aircraft-based data traffic controller 158 and/or a ground-based data traffic controller 148.

Figure 4:
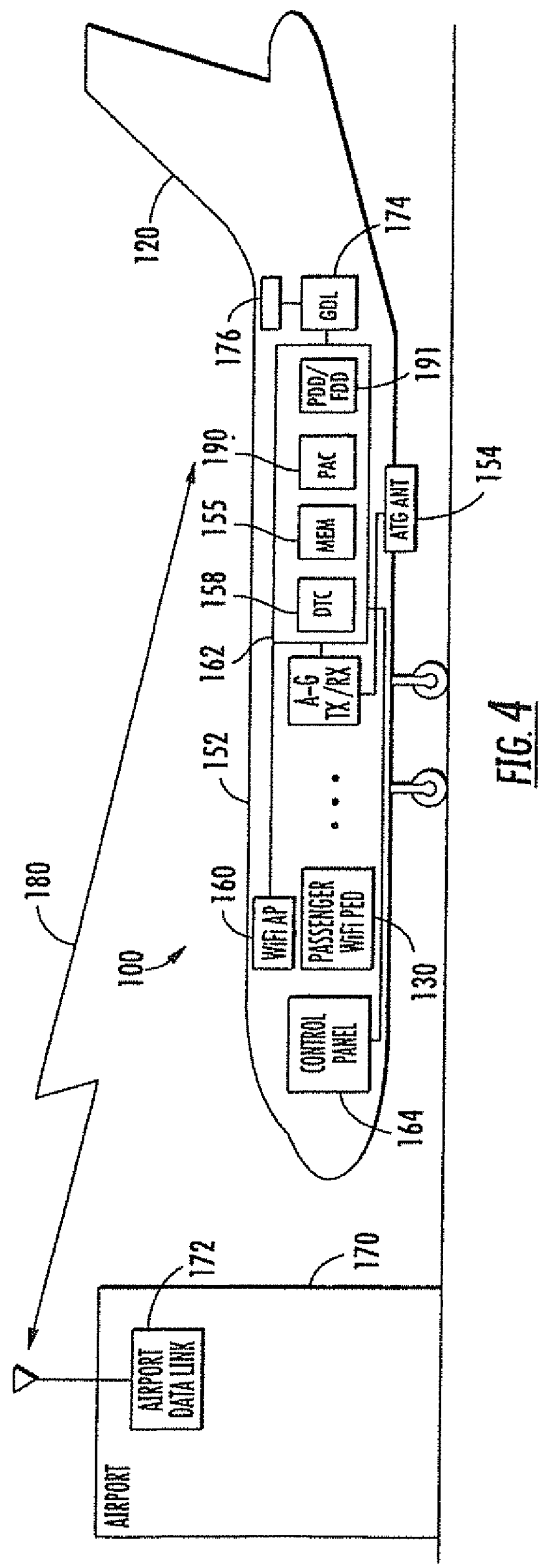
FIG. 4 is a schematic diagram of the air-to-ground communications network in which predetermined web pages are transmitted over an airport data link for storage on the aircraft in accordance with the present invention.

Referring now to FIG. 4, another aspect will be discussed with respect to the data memory cache 155 cooperating with the access point 160 for storing common data accessible by the PEDs 130 during flight of the aircraft 120. The common data may be in the form of web pages in which passengers can browse via their PED 130.

One of the functions of the data memory cache 155 is for caching predetermined web pages to be browsed. Instead of the aircraft 120 receiving the web pages while in-flight, the web pages are received while the aircraft is on the ground. Nonetheless, the web pages may be alternatively or additionally updated or refreshed while in flight. As an alternative to the data memory cache 155, streaming video or audio could be real time or stored as provided from a satellite, including via a preexisting satellite based IFE system on the aircraft 120.

The stored web pages may be directed to a particular topic or theme, such as services and products. The services may also be directed to advertisements, for example. A purchase acceptance controller 190 cooperates with the WLAN to accept a purchase from the PEDs 130 responsive to the common data related to the services and products.

For example, the web content may be directed to an electronic retail supplier so that any one of the passengers on-board the aircraft 120 can shop for a variety of different items using their PED 130. Once a passenger selects an item for purchase, the transaction can be completed in real time while being airborne via the purchase acceptance controller 190 communicating over the air-to-ground link 200. This form of on-board shopping may also be referred to as air-commerce. Alternatively, the transaction could be initiated on-board the aircraft 120 via the purchase acceptance controller 190 but the actual purchase could be forwarded via the ground data link 174 once the aircraft 120 is on the ground.

The data memory cache 155 may be configured to push the common data related to the services and products to the PEDs 130. Also, the data memory cache 155 may permit the PEDs 130 to pull the common data related to the services and products therefrom.

Figure 5:
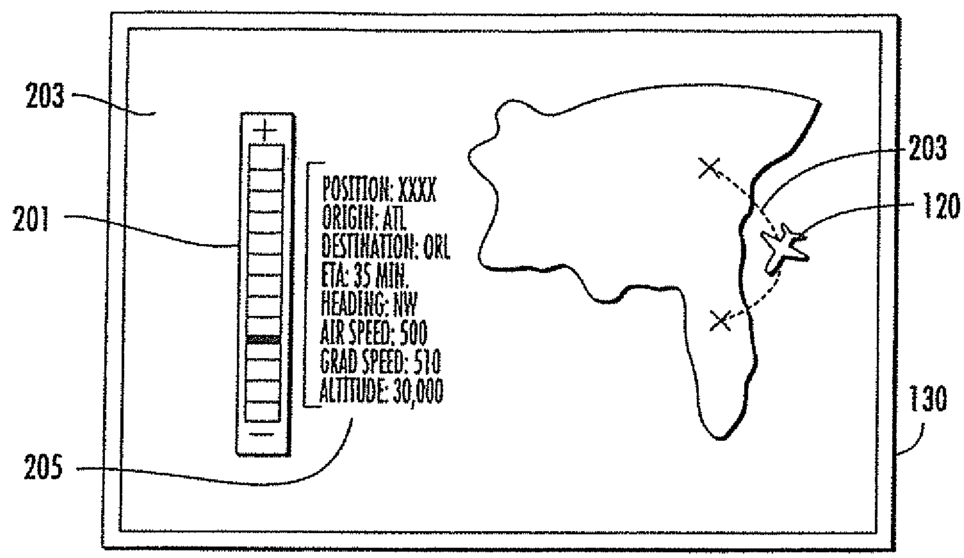
FIG. 5 is a screen shot from a PED of an interactive map corresponding to the flight path of the aircraft in accordance with the present invention.
Figure 6:
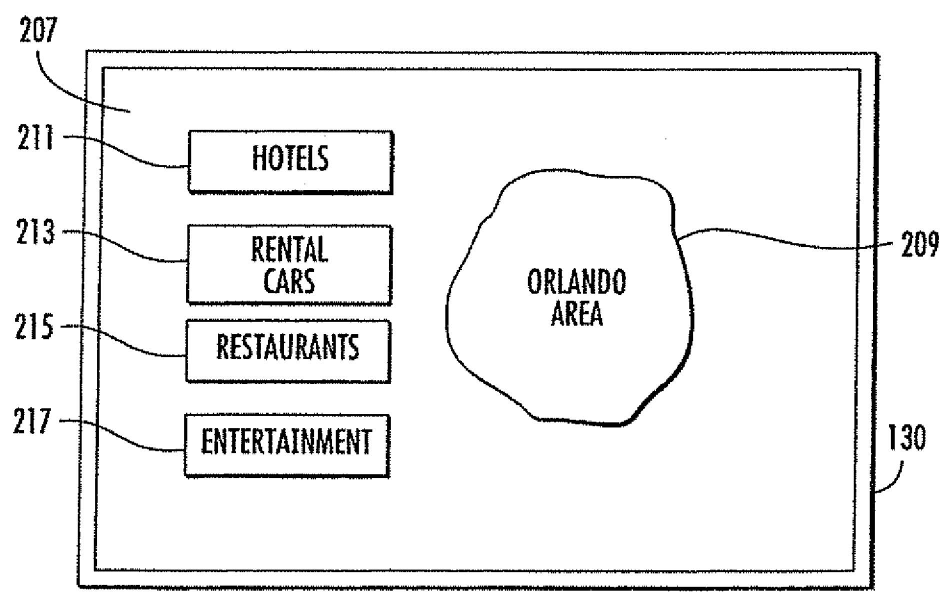
FIG. 6 is a screen shot from a PED of an interactive map corresponding to the destination of the aircraft in which different information categories are displayed in accordance with the present invention.

In addition to products and services, the common data is directed to interactive maps, as will now be discussed in reference to FIGS. 5 and 6. When an interactive map is displayed on a PED 130, the passenger is able to scroll or zoom in and out using a scroll or zoom bar 201, as illustrated by the screen shot 203 from their PED 130. The interactive maps preferably correspond to the flight path 203 of the aircraft 120, and are updated or refreshed via the ground data link 174 when the aircraft 120 is parked on the ground at the airport 170.

While in flight, the current location of the aircraft 120 can be displayed, Flight information 205 may also be displayed. The current location of the aircraft 120 may be provided by a position determining device/flight path determining 191, such as a GPS system carried by the aircraft. Alternatively, the position of the aircraft 120 can be determined on the ground and passed to the aircraft over the air-to-ground link 200. The final destination of the aircraft 120 can also be displayed prior to arrival at the destination. In addition, destination information such as the arriving gate number, connecting gate numbers, baggage claim information, hotels, rental car agencies, restaurants, etc. could also be displayed.

Data associated with the destination 209 may also be made available to the passengers. As illustrated by the screen shot 207 from a PED 130, data categories titled Hotels 211, Rental Cars 213, Restaurants 215 and Entertainment 217 are available for viewing by the passenger.

If the passenger does not already have a hotel reservation, then a desired or preferred hotel associated with the destination of the aircraft 120 can be selected from the Hotels category 211. The communications system 100 advantageously allows the passenger to make a hotel reservation while in flight. Likewise, a rental car reservation can also be made while in flight if a car is needed. Other points of interest or services (such as restaurants and entertainment) associated with the destination of the aircraft 120 can also be made available to the passengers, including reservations, coupons and other available discounts, for example.

Referring back to FIG. 4, when the aircraft 120 is parked on the ground at the airport 170, a wireless airport data link 172 is used to transmit the web content pages to the data memory cache 155 via a ground data link receiver 174 carried by the aircraft 120. A ground data link antenna 176 is coupled to the ground data link receiver 174. The ground data link interface 180 may be compatible with 802.11 or 802.16, for example. The ground data link interface 180 may be Wi-Fi or WiMax for the aircraft 120. Other interface standards may be used as will be readily appreciated by those skilled in the art. These interfaces also include cellular and PCS compatibility, for example.

When the aircraft 120 lands at a different airport, the web pages can be updated or refreshed over the ground data link interface 180. In addition, email and text messaging by the PEDs 130 may be continued after the aircraft is on the ground. Since the air-to-ground interface 200 may not be available when the aircraft 120 is on the ground, the ground data link interface 180 would then be used.

Once the web pages are stored in the data memory cache 155, a passenger using their Wi-Fi or WiMax enabled PED 130 can access and browse the web pages for on-board shopping while the aircraft 120 is airborne. The data memory cache 155 is sufficiently sized for storing a large amount of information, as will be readily appreciated by those skilled in the art.

The on-board shopping just described is for items that are not carried on the aircraft 120. On-board shopping may also be provided to the passengers for a limited number of products. For example, when watching a movie or listening to music, passengers have the option of receiving standard headphones or they can purchase a different set of headphones, such as high quality noise suppression headphones. These transactions can also be completed via the passenger's PED 130 using the web-based pages stored in the data memory cache 155.

Another aspect of the illustrated embodiment is directed to a method for operating a communications system 100 for an aircraft 120 carrying at least some personnel having personal electronic devices (PEDs) for wireless data communications outside the aircraft with a ground-based communications network. The communications system 100 may include an access point 160 in the aircraft 120 for providing a wireless local area network (WLAN) for data communications with the PEDs 130, and an air-to-ground transceiver 152 in the aircraft 120 cooperating with the access point 160 for data communications with the ground-based communications network. The method may comprise storing common data accessible by the PEDs 130 during flight of the aircraft 120 using an aircraft data memory cache 155 in the aircraft and cooperating with the access point 160.

Figure 7:
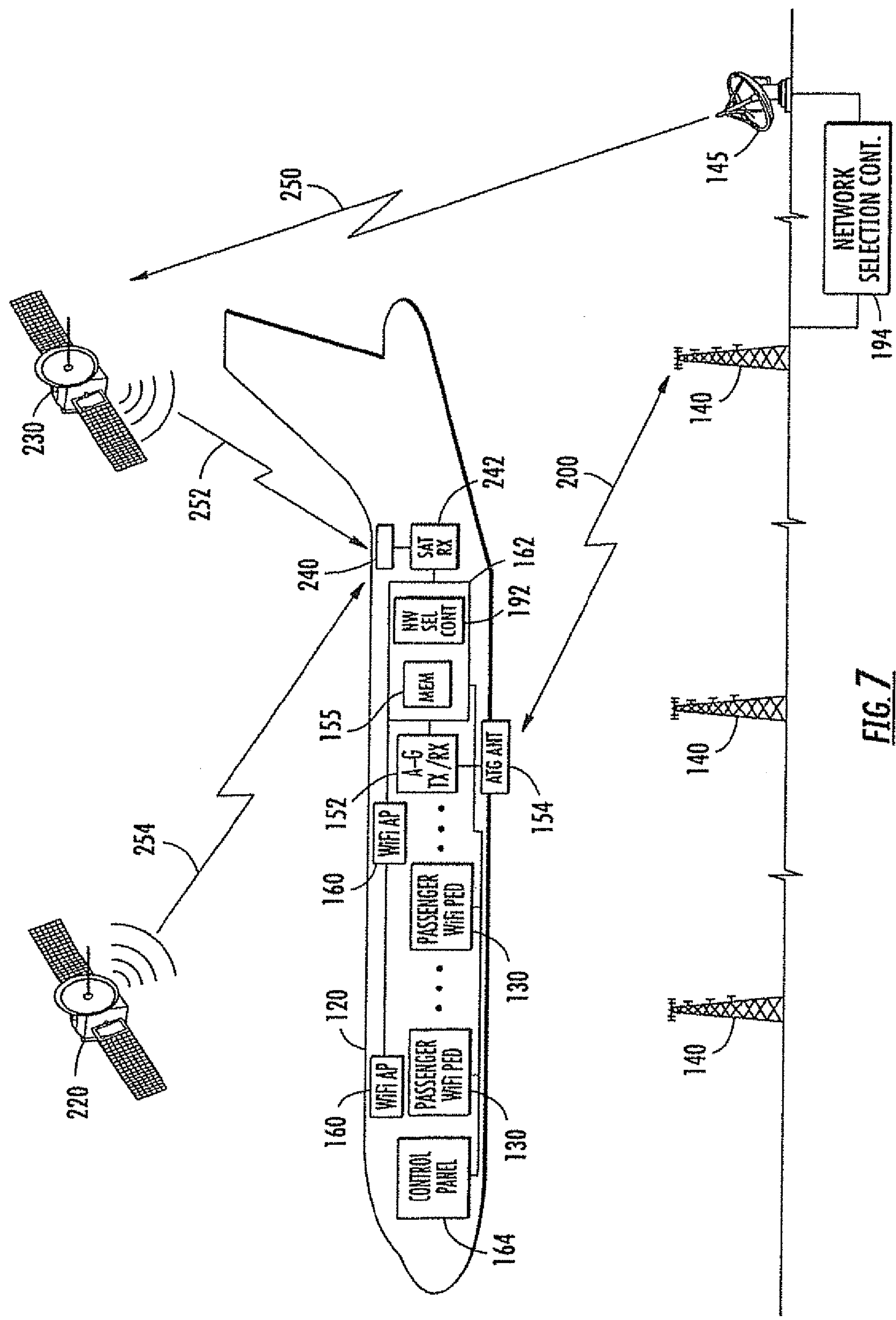
FIG. 7 is a schematic diagram of the air-to-ground communications network in which network selection controllers are used for selecting between satellite or air-to-ground communications in accordance with the present invention.

The PEDs 130 are not limited to receiving and transmitting information over the air-to-ground interface 200. Referring now to FIG. 7, signals may be transmitted from satellites 220, 230 to one or more satellite antennas 240 coupled to a satellite receiver 242 carried by the aircraft 120. If there are multiple satellite antennas, then a network selection controller 192 may be used to select the appropriate satellite antenna. This is in addition to transmitting and receiving signals over the air-to-ground interface 200 via the ground-based network and the air-to-ground transceiver 152 carried by the aircraft 120.

In the illustrated embodiment, an aircraft-based network selection controller 192 is associated with the air-to-ground transceiver 152 and the access points 160. The aircraft-based network selection controller 192 determines whether data communications should be sent to the PEDs 130 through the air-to-ground transceiver 152 or the satellite receiver 242. This is accomplished by appending data to return via a satellite.

In addition or in lieu of the aircraft-based network selection controller 192, a ground-based network selection controller 194 is coupled between a ground-based satellite transmitter 145 and the ground-based base stations 140. The ground-based network selection controller 194 also determines whether to send data communications to the PEDs 130 through the air-to-ground transceiver 152 or through the satellite receiver 242.

Satellite 220 provides television and digital radio signals for an in-flight entertainment (IFE) system on the aircraft 120 over satellite link 254. Even though only one satellite is represented, the television and digital radio signals may be provided by separate satellites, such as a DirectTV™ satellite and an XM™ radio satellite. In addition, a third satellite may be used to provide email and text messaging, multimedia messaging, credit card transactions, web surfing, etc. The illustrated satellite antenna 240 supports communications with all three satellites. Alternatively, there may be a separate satellite antenna for the DirectTV™ satellite, the XM™ radio satellite, and the email-text messaging satellite.

An example IFE system is disclosed in U.S. Pat. No. 6,748,597. This patent is assigned to the current assignee of the present invention, and is incorporated herein by reference in its entirety. The television and digital radio signals are sent through the on-board server 162 to seat electronic boxes (SEBs) spaced throughout the aircraft for selective viewing on video display units (VDUs). Passenger control units (PCUs) are used to control the VDUs. The digital radio signals are also distributed to the SEBs for reception via passenger headphones.

Of particular interest is that additional information can be obtained from the satellite 220 which can then be made available to the PEDs 130. For example, the satellite 220 may provide information including sports scores, stock ticker, news headlines, destination weather and destination traffic. The satellite signals received by the satellite receiver 242 are provided to the on-board server 162 for repackaging this particular information for presentation to the PEDs 130 via the access points 160, as will be readily appreciated by those skilled in the art.

When available, satellites with or without leased transponders may also provide additional information to be repackaged by the on-board server 162. The other satellite 230 may be a fixed satellite service (FSS) for providing Internet access to the PEDs 130, for example. For example, satellite television and satellite radio signals may be provided to the passengers on their PEDs 130 via Wi-Fi.

In this configuration, a message for web pages requested by the passenger (via their PED 130) is provided over the air-to-ground interface 200. The message on the ground would then be routed to an appropriate ground-based network selection controller 194, which would then transmit the request to the FSS satellite 230. The satellite link between the appropriate ground-based transmitter 145 and the satellite 230 is represented by reference 250. The FSS satellite 230 then transmits the requested web pages to the aircraft 120 over satellite link 252 upon receiving the request from the ground.

Since the satellites may be somewhat close together in a geospatial arc, transmitting the return link over the air-to-ground link 200 instead of over the satellite links 252, 254 avoids causing interference from the aircraft 120 to neighboring satellites. Nonetheless, the request could be transmitted directly from the aircraft 120 to the satellite 230 using a steerable or directional satellite antenna.

The request provided by the PED 130 is often referred to as the return link. The information from the satellites 220, 230 to the aircraft 120 is often referred to as the forward link. The air-to-ground interface 200 is a narrow band interface, which is acceptable for making a request since such a request is typically narrower band than the forward link. In contrast, satellite links 252 and 254 are wide band interfaces, which are ideal for providing the requested web pages that are typically wide band data.

Each of the network selection controllers 192, 194 may be used to determine whether to send data communications to the PEDs 130 through the air-to-ground transceiver 152 or the satellite receiver 242 based on a needed channel capacity of the data communications to be sent or congestion on a link. Data communications with a higher needed channel capacity is typically sent with a high bandwidth using the satellite receiver 242, and data communications with a lower needed channel capacity is typically sent with a low bandwidth using the air-to-ground transceiver 152. Alternatively, the high and low broadband data communications links may be reversed. Alternatively, the network controllers could determine that the aircraft 120 is out of the coverage area for the air-to-ground network or the air-to-ground network is at capacity in the location for that aircraft. In this case, the network selection controllers could route the traffic over the satellite network. Alternatively, the network selection controllers could route some traffic types over one network and other traffic types over the other network, as readily appreciated by those skilled in the art.

One of the network selection controllers 192, 194 may determine to send data communications to the PEDs 130 through the air-to-ground transceiver 152 or through the satellite receiver 242 based on received signal strength of the data communications, or a position of the aircraft. The current location of the aircraft 120 may be provided by a position determining device/flight path determining 191, such as a GPS system carried by the aircraft. Alternatively, the position of the aircraft 120 can be determined on the ground and passed to the aircraft over the air-to-ground link 200. If the aircraft 120 is to fly over the ocean, then data should be received through the satellite receiver 242. By monitoring signal strength of the received signals or the position of the aircraft, a determination can be made on when the ground-based base stations 140 are no longer available, and communications should be received via the satellite receiver 242.

The network selection controllers 192, 194 thus determine whether to send static and dynamic web pages through the satellite-based communications network 145, 230 to the PEDs 130. Dynamic web pages include streaming video, for example. Each network selection controller 192, 194 may determine to send requests for at least one of the static and dynamic web pages from the PEDs 130 through the access points 160 and the air-to-ground transceiver 152.

As noted above, predetermined web pages are stored in the data memory cache 155 when the aircraft 120 is parked on the ground (i.e., electronic retailer shopping and on-board shopping, as well as advertisements). Since the satellite links 252, 254 are wide band, the requested web information may also be downloaded for storage or refreshed in the data memory cache 155 while the aircraft is in flight.

Another aspect of the illustrated embodiment is directed to a method for operating a communications system 100 for an aircraft 120 carrying at least some personnel having personal electronic devices (PEDs) 130 for wireless data communications outside the aircraft. The communications system 100 includes a ground-based communications network, a satellite-based communications network, and at least one access point 160 in the aircraft 120 for providing a WLAN for data communications with the PEDs 130. An air-to-ground transceiver 154 in the aircraft 120 may cooperate with the at least one access point 160 for data communications with the ground-based communications network, and a satellite receiver 242 in the aircraft may cooperate with the at least one access point for data communications with the satellite-based communications network to the PEDs. The method includes determining whether to send data communications to the PEDs 130 through the air-to-ground transceiver 152 or the satellite receiver 242.

Figure 8:
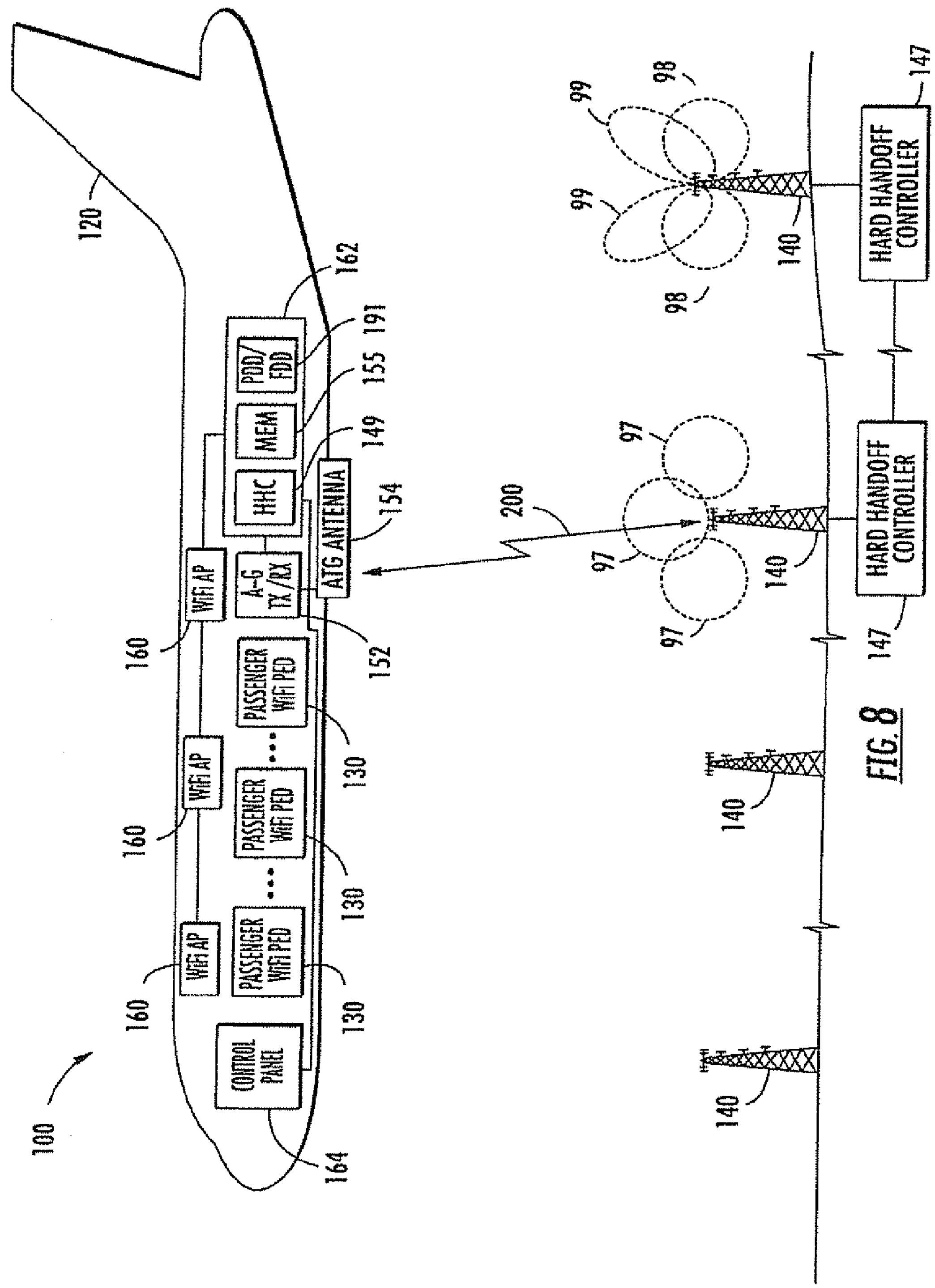
FIG. 8 is a schematic diagram of the air-to-ground communications network in which hard handoff controllers are used for handing off the aircraft between base stations in accordance with the present invention.

Referring now to FIG. 8, another aspect is directed to handoff of the aircraft 120 from one ground-based base station 140 to an adjacent ground-based base station, or between azimuth or elevation sectors on one base station. Since the air-to-ground network 100 may be optimized for data instead of voice, delays or latencies can be tolerated without the end user having the perception that the call is being dropped as is the case with voice. Consequently, soft handoffs are needed for voice-based networks.

In contrast, data can be stored on the ground or on the aircraft while the aircraft 120 is between cell coverage areas for a hard handoff. Once the aircraft 120 is within coverage of the next cell, the data can then be forwarded.

Hard handoffs can thus be used to make the connection from one base station 140 to an adjacent base station in support of the air-to-ground communications network 100. Messages being communicated between a PED 130 and the ground can be stored in a buffer or memory 157. The buffer 157 may be part of the data memory cache 155, or alternatively, the buffer may be a separate memory as illustrated. Each base station 140 has a hard handoff controller 147 associated therewith. Moreover, with the aircraft 120 typically flying at speeds over 500 mph, the delay is relatively short.

To support a soft handoff, as would be necessary with voice, twice the spectrum resources would be needed. With a hard handoff, the spectrum is preserved at the expense of having sufficient memory for storing data in the buffer 157 (or on the ground) during a handoff while the aircraft 120 is between base stations 140.

The base stations 140 define respective adjacent coverage areas and comprise respective hard handoff controllers 147 for implementing a hard handoff of a data communications channel with the air-to-ground transceiver 152 as the aircraft 120 moves from one coverage area to an adjacent coverage area.

An aircraft hard handoff controller 149 may cooperate with the hard handoff controllers 147 on the ground. The aircraft hard handoff controller 149 cooperates with ground-based hard handoff controllers 147 by monitoring metrics. The metrics include a received signal strength of the data communications channel, or available capacity at the base station 140, for example.

In another embodiment for implementing an aircraft hard handoff, the aircraft hard handoff controller 149 implements the hard handoff of a data communications channel with the air-to-ground transceiver 152 as the aircraft 120 moves from one coverage area to an adjacent coverage area. This implementation may be based on metrics collected in the aircraft. These metrics include a Doppler shift of the data communications channel, a signal-to-noise ratio of the data communications channel, or a received signal strength of the data communications channel. This implementation may also be based on position of the aircraft 120, as readily appreciated by those skilled in the art.

The buffer 157 may be separate from the aircraft hard handoff controller 149 or may be integrated as part of the hard handoff controller. The first and second hard handoff controllers 147 may implement the hard handoff based on the following metrics: a Doppler shift of the data communications channel, a signal-to-noise ratio of the data communications channel, or a received signal strength of the data communications channel, as will be readily appreciated by those skilled in the art.

In other embodiments, a position/flight determining device 191 on the aircraft 120 cooperates with the ground-based hard handoff controllers 147 for implementing the hard handoff based upon a position of the aircraft. The position/flight path determining device 191 may be a GPS or other navigational device.

The base stations 140 may be configured with selectable antenna beams for performing the hard handoff, as will now be discussed. In one embodiment, one or more of the base stations 140 include selectable antenna beams 97, with each antenna beam having a same pattern and gain but in a different sector as compared to the other antenna beams. The different sector may also be defined in azimuth and/or elevation. Each antenna beam 97 may be optimized in terms of gain and beam width. The minimally overlapping antenna beams 97 thus provide complete coverage in the different sectors.

In another embodiment, one or more of the base stations 140 include selectable antenna beams 98 and 99, with at least two antenna beams being in a same sector but with a different pattern and gain. Antenna beam 99 is high gain with a narrow beam width for communicating with the aircraft 120 at an extended distance from the base station 140. When the aircraft 120 is closer in range to the base station 140, antenna beam 98 is selected, which is low gain with a wide beam width.

As noted above, there are a number of different metrics to monitor to determine when airborne users (i.e., PEDs 130) within an aircraft 120 are to be handed off to a next base station 140. In terms of Doppler, the Doppler shift on the MAC addresses of the signals received by each base station 140 are examined. The Doppler metric is to be factored into the handoff algorithm at each base station 140.

When using GPS coordinates, each base station 140 receives GPS coordinates of the aircraft 120, and based upon movement of the aircraft, the base stations coordinate handoff of the aircraft accordingly from base station to base station.

Along the same lines, sectorized antennas at the base station 140 may be used for communicating with the aircraft 120. The antennas at each base station 140 may provide a high gain/narrow beamwidth coverage sector and a low gain/broad beamwidth coverage sector. The high gain/narrow beamwidth coverage sector may be used when link conditions with the aircraft 120 are poor. Sites could be sectorized in azimuth, elevation or both. These sectors could be static or dynamic.

If the link conditions with the aircraft 120 are good, then the low gain/broad beamwidth coverage beam is used. In one embodiment, the coverage sectors are selected based upon the link conditions with the aircraft 120. Alternatively, the coverage sectors are fixed at the base station 140. For example, the high gain/narrow beamwidth coverage sector may be used for aircraft 120 that are farther away from the base station 140, whereas the low gain/broad beamwidth coverage sector may be used for aircraft flying near the base station.

Lastly, a ground selection algorithm may be used to select a ground-based base station 140 based on the flight path and the base stations in proximity to the flight path. If the aircraft 120 is about to exit a cell, transmitted email and text messages for a PED 130 are stored until the aircraft is in the next coverage area. This advantageously allows a longer continuous connection, which makes use of the limited spectrum resources more efficiently. The ground selection algorithm could use ground-based location information or GPS data on the location of the aircraft 120 and known ground site locations to optimize connection times. The resulting system may thus be considered a store-and-forward architecture.

Another aspect of the illustrated embodiment is directed to a method for operating a communications system 100 for an aircraft 120 carrying at least some personnel having personal electronic devices (PEDs) 130 for wireless data communications outside the aircraft with a ground-based communications network. The communications system 100 includes a plurality of spaced apart base stations 140, and at least one access point 160 in the aircraft 120 for providing a wireless local area network (WLAN) for data communications with the PEDs 130. An air-to-ground transceiver 152 in the aircraft 120 may cooperate with the at least one access point 160 for data communications with the ground-based communications network. The method may include operating first and second base stations 140 to define respective first and second adjacent coverage areas, with the first and second base stations comprising respective first and second hard handoff controllers 147. The respective first and second hard handoff controllers 147 are operated for implementing a hard handoff of a data communications channel with the air-to-ground transceiver 152 as the aircraft 120 moves from the first coverage area to the second adjacent coverage area. Alternatively, the handoff decision can be implemented by an aircraft hard handoff controller 149 in the aircraft 120. This implementation may be based on metrics collected in the aircraft 120.

Figure 9:
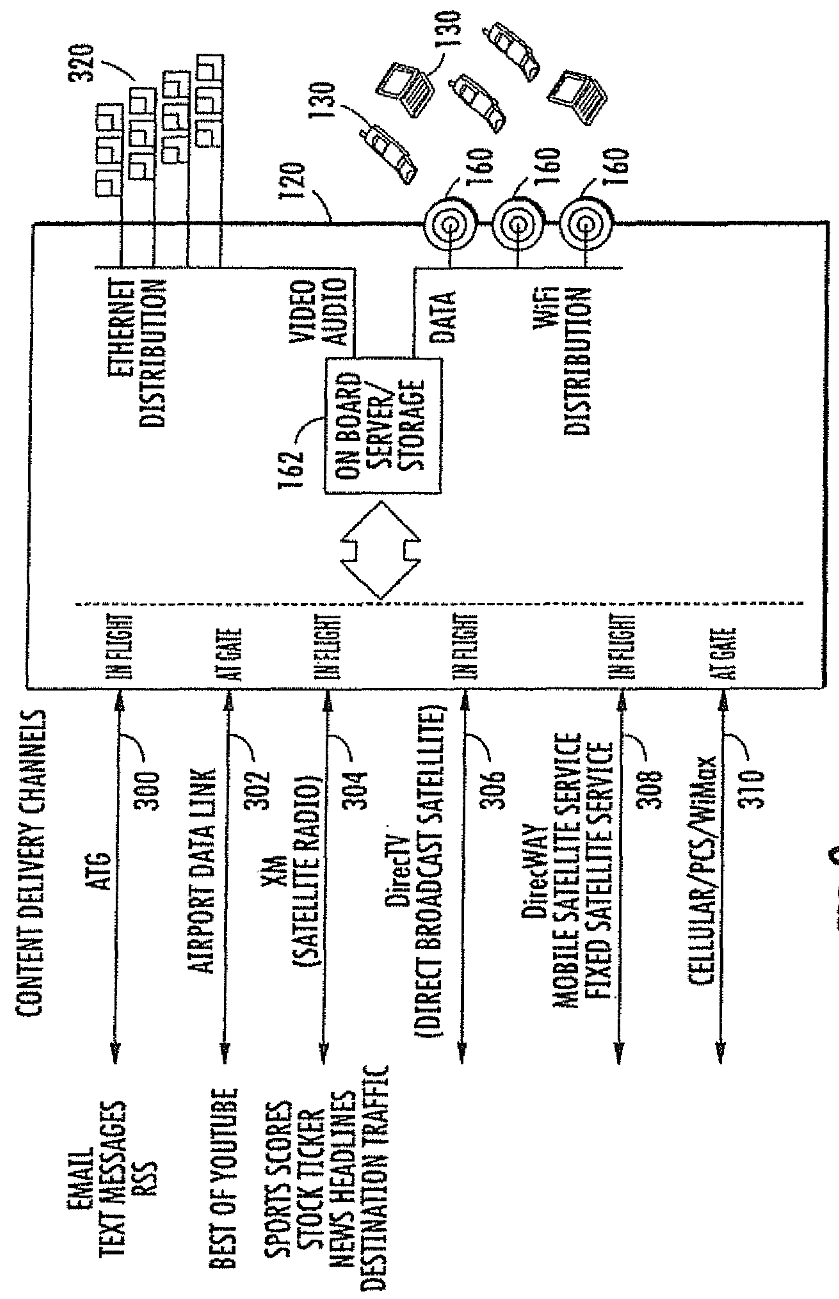
FIG. 9 is a schematic diagram of the different content delivery channels available for distribution to the aircraft passengers in accordance with the present invention.

To summarize example on-board content deliveries to the aircraft 120 from the various sources, reference is directed to FIG. 9. When in flight, the air-to-ground interface 200 provides connectivity for features that include email, text messaging, credit card transactions, multimedia messaging, web surfing and RSS as indicated by reference 300. To use RSS, the PED 130 has an RSS news reader or aggregator that allows the collection and display of RSS feeds. RSS news readers allow a passenger to view the service selected in one place and, by automatically retrieving updates, stay current with new content soon after it is published. There are many readers available and most are free.

The airport data link 172 may be used to provide the best of YouTube™ as indicated by reference 302. The XM™ satellite 220 may provide sports scores, stock ticker, news headlines and destination traffic as indicated by reference 304. DirectTV™ may also be provided by satellite 220 which can be used to provide additional information as indicated by reference 306. For future growth, two-way communications may be provided by a satellite as indicated by reference 308, such as with DirecWay or Hughesnet, for example. The airport data link 172 may also be used to provide cellular/PCS/WiMax services as indicated by reference 310.

The above content is provided to the on-board server 162 which may include or interface with the data memory cache 155. The data is provided to passenger PEDs 130 using Wi-Fi or WiMax distribution via the access points 160. Video and data is provided to an Ethernet distribution 320 for distributing throughout the aircraft as part of the in-flight entertainment system.

Figure 10:
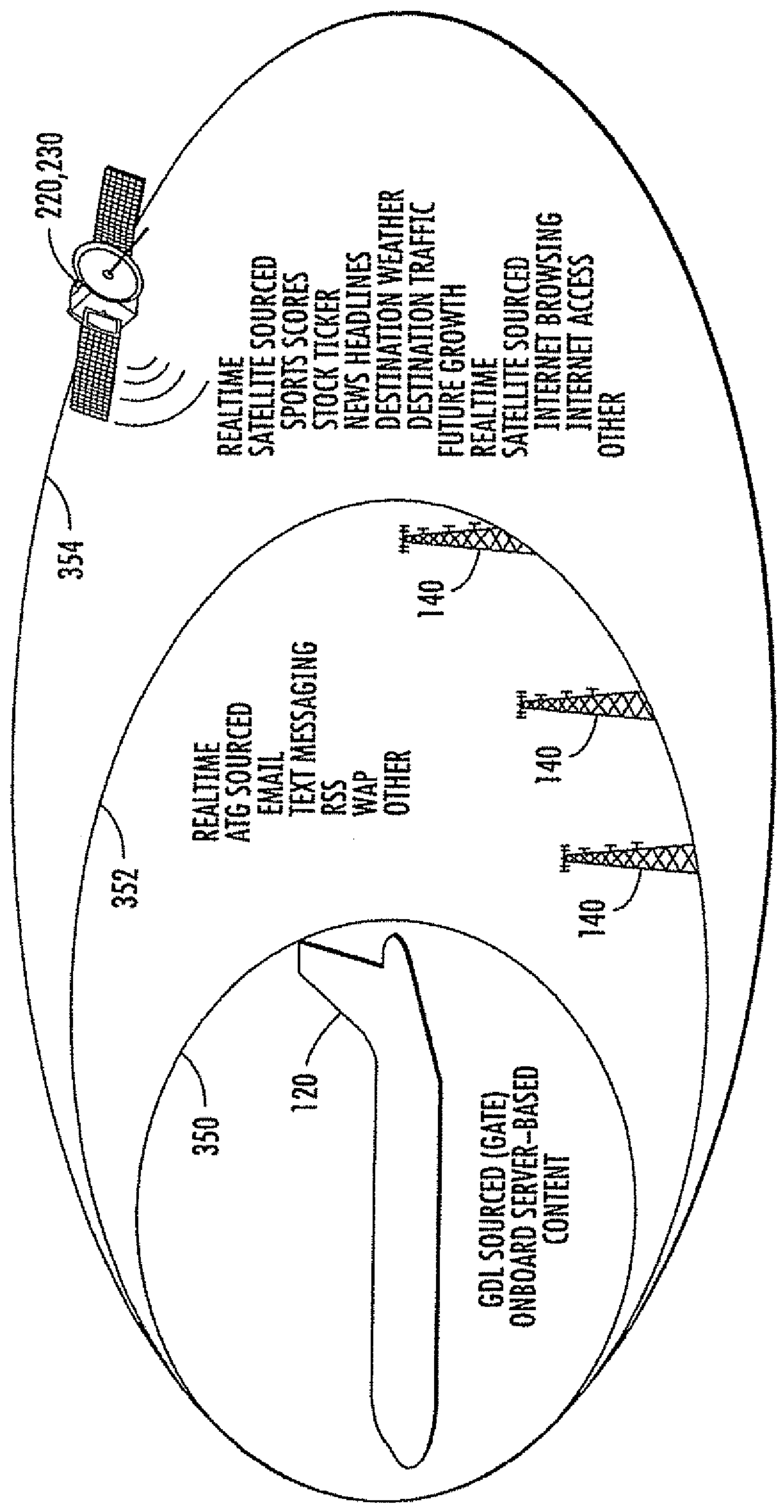
FIG. 10 is a schematic diagram of the aircraft illustrating the different ranges in which data communications is received in accordance with the present invention.

In terms of transmission distance or proximity to the aircraft 120 for the above-described on-board content deliveries, reference is directed to FIG. 10. Circle 350 represents information provided by the airport ground data link 172 when the aircraft 120 is parked at the airport 170 or moving about the airport with weight on wheels. When airborne, circle 352 represents information provided via the air-to-ground interface 200, and circle 354 represents the information provided by the satellites 220, 230. The information as discussed above is summarized in the respective circles 350, 352 and 354.

In view of the different air interface standards associated with the aircraft 120, the on-board server 162 may be configured to recognize the available air interface standards. As a result, the on-board server 162 selects the appropriate air interface standard based on proximity to a particular network. This decision may also be based on the bandwidth that is available, location of the aircraft 120 as determined by GPS, and whether the aircraft is taking off or landing. For example, when the aircraft 120 is on the ground, the ground data link interface 180 is selected. When airborne, the network selection controllers 192, 194 select either the air-to-ground interface 200 or a satellite interface 252, 254 depending on traffic demands, or both, for example.

Depending on the airline rules and regulations, the cellular mode of a dual mode cellular/Wi-Fi device may not be operated on an aircraft below a certain altitude, such as 10,000 feet. To support this requirement, the on-board server 162 and the Wi-Fi access points 160 may have enough pico-cell capability to drive the cellular radio in dual mode devices to minimum power or even to turn the cellular radios off. The connection to the wireless onboard network could be WiFi or WiMax. The pico-cell function would be to drive cellular/PCS output power to a reduced/minimum or off condition. This turns the cellular/PCS transmitter "off" while on the aircraft, while allowing Wi-Fi transmission and reception.

Another metric to monitor on the aircraft 120 is related to priority of service. This is due to the fact that that aircraft 120 can receive information over a wide band link from a satellite, for example, and transmit requests for the information over a narrow band link. If someone tries to send a large attachment on their email over the narrow band link, or they are video/audio streaming, then access will be denied or throttled or charged for a premium service for large data transfers by the data traffic controllers 158, 148. It could also be possible to use pica-cells to connect cellular/PCS mobile phones (PED) 130 to the onboard systems.

Therefore, traffic is monitored in terms of metrics to make quality of service and priority of service decisions. This decision may be made on-board the aircraft 120 for any traffic leaving the aircraft 120. This decision may also be made on the ground, which monitors if someone on the ground is sending to large of an attachment, and if so, then access will also be denied or throttled or charged for a premium service for large data transfers. These criteria for decisions could by dynamic or static.

Priority of service also relates to quality of service. Various metrics and traffic conditions can be monitored to provide connectivity to a greater or maximum number of airline passengers on a flight. Operations and cabin passenger entertainment (email, text messaging, web browsing, etc.) data can be multiplexed on a variable latency link. Operational and passenger data may also be multiplexed with multiple priorities of service allowing some data to be handled at a higher priority than other data.

Yet another aspect of the aircraft air-to-ground communications network 10 is with respect to advertisements. The advertisements are used to generate revenue from the air to ground, hybrid air to ground/satellite, or satellite communications network. For example, when a passenger opens up their laptop computer 130 on the aircraft 120, a decision is made whether or not to use the 802.11 Wi-Fi or 802.16 WiMax network. If the decision is yes, then an advertisement is displayed while accessing the network.

In addition, when portal pages are viewed, advertisements will also be displayed. Since the advertisements are used to generate revenues, passengers are allowed access to the air-to-ground communications network 100 without having to pay with a credit card or touchless payment method, as was the case for the Connexion by Boeing[SM] system. While looking at different web pages, the passengers will see advertisements interspersed or sharing the same screen.

Another function of the aircraft 120 is to use the air-to-ground communications network 100 for telemetry. Telemetry involves collecting data at remote locations, and then transmitting the data to a central station. The problem arises when the data collection devices at the remote locations are separated beyond line-of-sight from the central station. Consequently, one or more towers are required to complete the telemetry link. To avoid the costly expense of providing telemetry towers, the aircraft 120 may be used to relay the collected information from the remote locations to the central station when flying overhead.

Yet another function of the aircraft 120 is to use the air-to-ground communications network 100 for ground-based RFID tracking. Similar to using the aircraft 120 for telemetry, the aircraft may also be used for tracking mobile assets on the ground, such as a fleet of trucks, for example. The trucks transmit RFID signals that are received by the aircraft 120 as it flies overhead. The information is then relayed to a central station. The RFID signals may be GPS coordinates, for example.

Another aspect of the air-to-ground communications network 100 is to provide video on demand on the aircraft 120. This feature has been partially discussed above and involves providing television signals on demand to passengers on the aircraft. The television signals may be terrestrial based or relayed via a satellite. In particular, the return to make the request is not the same as the forward link providing the video. The return link is a low data rate link, and may be provided by the aircraft passenger's PED 130 over the air-to-ground interface 200. The forward link is a high data rate link received by a terrestrial or satellite based receiver on the aircraft. The video is then routed through the aircraft in-flight entertainment system to the passenger, or to the passenger's PED 130 via Wi-Fi. Alternatively, the video or audio can be stored in the server 162 and displayed when requested by a passenger.

Many modifications and other embodiments of the invention will come to the mind of one skilled in the art having the benefit of the teachings presented in the foregoing descriptions and the associated drawings. In addition, other features relating to the aircraft communications system are disclosed in U.S. application Ser. No. 12/047,349 filed Mar. 13, 2008, now U.S. Pat. No. 8,233,425 issued Jul. 31, 2012; U.S. application Ser. No. 12/047,421 filed Mar. 13, 2008, now U.S. Pat. No. 8,094,605 issued Jan. 10, 2012; and U.S. patent application Ser. No. 12/047,410 filed Mar. 13, 2008, now U.S. Pat. No. 8,504,019 issued Aug. 6, 2013, the entire disclosures of which are incorporated herein in their entirety by reference. Therefore, it is understood that the invention is not to be limited to the specific embodiments disclosed, and that modifications and embodiments are intended to be included as readily appreciated by those skilled in the art.

That which is claimed:

1. A communications system for an aircraft carrying at least some personnel having personal electronic devices (PEDs) for wireless data communications outside the aircraft, the communications system comprising:

a ground-based communications network;

a satellite-based communications network;

at least one access point in the aircraft for providing a wireless local area network (WLAN) for data communications with the PEDs;

an air-to-ground transceiver in the aircraft cooperating with said at least one access point for data communications with said ground-based communications network;

a satellite receiver in the aircraft cooperating with said at least one access point for data communications with the satellite-based communications network to the PEDs; and at least one network selection controller for determining whether to send data communications to the PEDs through said air-to-ground transceiver or said satellite receiver based on a communications link metric.

2. The communications system according to claim 1 wherein said at least one network selection controller comprises a ground-based network selection controller associated with said ground-based communications network.

3. The communications system according to claim 1 wherein said at least one network selection controller comprises an aircraft-based network selection controller associated with said at least one access point and said air-to-ground transceiver.

4. The communications system according to claim 1 wherein the communications link metric is based on a needed channel capacity of the data communications to be sent; and wherein said at least one network selection controller determines whether to send data communications to the PEDs through said air-to-ground transceiver or said satellite receiver based on the needed channel capacity of the data communications to be sent.

5. The communications system according to claim 4 wherein said at least one network selection controller determines to send data communications with a higher needed channel capacity with a high bandwidth using said satellite receiver, and determines to send data communications with a lower needed channel capacity data communications with a low bandwidth through said air-to-ground transceiver.

6. The communications system according to claim 1 wherein the communications link metric is based on at least one of a received signal strength of the data communications, and a position of the aircraft; and wherein said at least one network selection controller determines to send data communications to the PEDs through said air-to-ground transceiver or said satellite receiver based on at least one of the received signal strength of the data communications, and the position of the aircraft.

7. The communications system according to claim 1 wherein said at least one network selection controller determines to send at least one of static and dynamic web pages through said satellite-based communications network to the PEDs through said at least one access point.

8. The communications system according to claim 7 wherein said at least one network selection controller determines to send requests for at least one of the static and dynamic web pages from the PEDs through said at least one access point and said air-to-ground transceiver.

9. The communications system according to claim 1 wherein the data communications comprise at least one of email data, text message data, entertainment data and Internet data.

10. The communications system according to claim 1 wherein the WLAN comprises at least one of an 802.11 WLAN and an 802.16 WLAN.

11. The communications system according to claim 1 wherein said at least one access point comprises a picocell.

12. The communications system according to claim 1 further comprising a satellite transmitter in the aircraft for transmitting data communications outside the aircraft via the satellite-based communications network.

13. An aircraft communications system for an aircraft carrying at least some personnel having personal electronic devices (PEDs) for wireless data communications outside the aircraft with either a ground-based communications network or a satellite-based communications network, the aircraft communications system comprising:

at least one access point in the aircraft for providing a wireless local area network (WLAN) for data communications with the PEDs;

an air-to-ground transceiver in the aircraft cooperating with said at least one access point for data communications with said ground-based communications network;

a satellite receiver in the aircraft cooperating with said at least one access point for data communications with the satellite-based communications network to the PEDs; and an aircraft-based network selection controller for determining whether to send data communications to the PEDs through said air-to-ground transceiver or said satellite receiver based on a communications link metric.

14. The aircraft communications system according to claim 13 wherein the communications link metric is based on a needed channel capacity of the data communications to be sent; and wherein said at least one network selection controller determines whether to send data communications to the PEDs through said air-to-ground transceiver or said satellite receiver based on the needed channel capacity of the data communications to be sent.

15. The aircraft communications system according to claim 14 wherein said aircraft-based network selection controller determines to send data communications with a higher needed channel capacity with a high bandwidth using said satellite receiver, and determines to send data communications with a lower needed channel capacity data communications with a low bandwidth through said air-to-ground transceiver.

16. The aircraft communications system according to claim 13 wherein the communications link metric is based on at least one of a received signal strength of the data communications, and a position of the aircraft; and wherein said at least one network selection controller determines to send data communications to the PEDs through said air-to-ground transceiver or said satellite receiver based on at least one of the received signal strength of the data communications, and the position of the aircraft.

17. The aircraft communications system according to claim 13 wherein said aircraft-based network selection controller determines to send at least one of static and dynamic web pages through said satellite-based communications network to the PEDs through said at least one access point.

18. The aircraft communications system according to claim 17 wherein said aircraft-based network selection controller determines to send the requests for at least one of the static and dynamic web pages from the PEDs through said at least one access point and said air-to-ground transceiver.

19. The aircraft communications system according to claim 13 wherein the data communications comprise at least one of email data, text message data, entertainment data and Internet data.

20. The aircraft communications system according to claim 13 wherein the WLAN comprises at least one of an 802.11 WLAN and an 802.16 WLAN.

21. The aircraft communications system according to claim 13 further comprising a satellite transmitter in the aircraft for transmitting data communications outside the aircraft via the satellite-based communications network.

22. A method for operating a communications system for an aircraft carrying at least some personnel having personal electronic devices (PEDs) for wireless data communications outside the aircraft, the communications system comprising a ground-based communications network, a satellite-based communications network, at least one access point in the aircraft for providing a wireless local area network (WLAN) for data communications with the PEDs, an air-to-ground transceiver in the aircraft cooperating with the at least one access point for data communications with the ground-based communications network, and a satellite receiver in the aircraft cooperating with the at least one access point for data communications with the satellite-based communications network to the PEDs; the method comprising:

determining whether to send data communications to the PEDs through the air-to-ground transceiver or the satellite receiver based on a communications link metric.

23. The method according to claim 22 further comprising providing at least one network selection controller.

24. The method according to claim 23 wherein the at least one network selection controller comprises at least one ground-based network selection controller associated with the ground-based communications network.

25. The method according to claim 23 wherein the at least one network selection controller comprises at least one aircraft-based network selection controller associated with the at least one access point and the air-to-ground transceiver.

26. The method according to claim 23 wherein the communications link metric is based on a needed channel capacity of the data communications to be sent; and wherein the at least one network selection controller determines whether to send data communications to the PEDs through said air-to-ground transceiver or the satellite receiver based on the needed channel capacity of the data communications to be sent.

27. The method according to claim 26 wherein the at least one network selection controller determines to send data communications with a higher needed channel capacity with a high bandwidth using the satellite receiver, and determines to send data communications with a lower needed channel capacity data communications with a low bandwidth through the air-to-ground transceiver.

28. The method according to claim 26 wherein the at least one network selection controller determines to send web pages through the satellite-based communications network to the PEDs through the at least one access point.

29. The method according to claim 26 wherein the at least one network selection controller determines to send requests for web pages from the PEDs through the at least one access point and the air-to-ground transceiver.

30. The method according to claim 22 wherein the data communications comprise at least one of email data, text message data, entertainment data and Internet data.

31. The method according to claim 22 wherein the communications system further comprising a satellite transmitter in the aircraft for transmitting data communications external the aircraft via the satellite-based communications network.

* * * * *

UNITED STATES PATENT AND TRADEMARK OFFICE

CERTIFICATE OF CORRECTION

PATENT NO. : 8,699,403 B2
APPLICATION NO. : 13/435499
DATED : April 15, 2014
INVENTOR(S) : Lynch et al.

It is certified that error appears in the above-identified patent and that said Letters Patent is hereby corrected as shown below:

In the Claims

Claim 28, Column 18, Line 60 Delete: "26"
Insert: --23--

Claim 29, Column 18, Line 64 Delete: "26"
Insert: --23--

Signed and Sealed this
Second Day of September, 2014

Michelle K. Lee
*Deputy Director of the United States Patent and Trademark Office*